United States Patent [19]

Binder

[11] 4,346,659
[45] Aug. 31, 1982

[54] BI-MODAL MECHANICALLY TRACKABLE ROAD VEHICLE WITH AUTOMATIC AXLE LATCHING MECHANISM

[75] Inventor: Hellmuth Binder, Stuttgart, Fed. Rep. of Germany

[73] Assignee: Daimler-Benz Aktiengesellschaft, Stuttgart, Fed. Rep. of Germany

[21] Appl. No.: 122,478

[22] Filed: Feb. 19, 1980

Related U.S. Application Data

[63] Continuation-in-part of Ser. No. 84,613, Oct. 15, 1979, Pat. No. 4,267,779.

[30] Foreign Application Priority Data

Oct. 13, 1978 [DE] Fed. Rep. of Germany ....... 2844626
Feb. 16, 1979 [DE] Fed. Rep. of Germany ....... 2905933

[51] Int. Cl.³ ............................................. B61F 9/00
[52] U.S. Cl. .................................. 104/247; 104/119; 105/144; 180/131
[58] Field of Search ............ 104/118, 119, 242, 244.1, 104/245, 247; 105/141, 144, 165, 167, 215 R; 180/131; 280/89, 113, 125; 100/79

[56] References Cited

U.S. PATENT DOCUMENTS

| 1,064,167 | 6/1913 | Pinthor | 105/167 X |
| 2,588,078 | 3/1952 | Black | 280/125 |
| 4,183,304 | 1/1980 | Förster | 104/247 |
| 4,231,295 | 11/1980 | Förster | 104/247 |
| 4,267,779 | 5/1981 | Binder | 104/247 |

FOREIGN PATENT DOCUMENTS

| 2643324 | 3/1978 | Fed. Rep. of Germany . |
| 2719705 | 11/1978 | Fed. Rep. of Germany . |
| 2315474 | 1/1977 | France | 104/247 |
| 303948 | 1/1929 | United Kingdom | 280/125 |
| 698785 | 11/1979 | U.S.S.R. | 105/215 R |

Primary Examiner—Randolph A. Reese
Attorney, Agent, or Firm—Craig and Antonelli

[57] ABSTRACT

A bi-modal mechanically trackable vehicle adapted to be driven with or without a guide track, the vehicle including at least one non-steerable axle having non-steerable wheels mounted thereon, a plurality of tracking transverse guide rollers are provided for guiding the vehicle along the track. The transverse guide rollers are at least indirectly mounted at the non-steerable axle in an area of the respective wheels so as to be transversely displaceable. The non-steerable axle is mounted on the vehicle so as to be freely pivotable about a vertical axis. An arrangement is provided for automatically selectively locking the at least one non-steerable axle in an exact transverse position for driving without a guide track and for unlocking the at least one non-steerable axle from the exact transverse position. The locking and unlocking arrangement includes a latch longitudinally displaceably mounted on the non-steerable axle and a retainer mounted on the frame of the vehicle so as to be immovable at least in a transverse direction. The retainer includes a latch retainer adapted to engage the latch in a substantially shape-fitting fashion when the at least one non-rotatable steering axle is in the exact transverse position.

37 Claims, 4 Drawing Figures

BI-MODAL MECHANICALLY TRACKABLE ROAD VEHICLE WITH AUTOMATIC AXLE LATCHING MECHANISM

This application is a continuation-in-part of my copending application, Ser. No. 84,613, filed Oct. 15, 1979, now U.S. Pat. No. 4,267,779.

The present invention relates to a road vehicle and, more particularly, to a mechanically trackable road vehicle which includes a steerable axle with steerable lockable wheels mounted thereon and at least one non-steerable axle having non-steerable wheels mounted thereon and with tracking transverse guide rollers with vertical rolling surfaces provided in an area of the vehicle axles, mounted thereon at least indirectly, in front of the corresponding axle housings, whereby the axles equipped with the non-steerable wheels, preferably the rear axles, are mounted in the manner of a turntable so that they are free to pivot or swivel on the vehicle about a vertical axis and are lockable and unlockable in an exact transverse position by means of a transverse position locking device.

A vehicle of the aforementioned type is proposed in, for example, German Offenlungsschrift Nos. 26 43 324 and 27 19 705. With vehicles of such type, the pivotability or swivelability of the rear axle is provided in order to reduce the clearance requirements of the vehicles when such vehicles are negotiating curves. Since one goal of the track mode being used for road vehicles is to maintain the space requirements for the tracked travel as low as possible, in case of longer or articulated vehicles, the clearance requirements of such vehicles becomes especially significant when such vehicles are negotiating curves. As can readily be appreciated, in order for such vehicles to be duo-mode, i.e. operable with guide tracks or on normal road surfaces, the mobility of the pivotable rear axle must be eliminated or blocked for trackless travel and the gear axle must be capable of being locked in an exact transverse position. A disadvantage of the vehicle such as proposed in the above-noted German Publications reside in the fact that they must be separately unlocked when the vehicle enters the track system and then must be separately locked again when the vehicle leaves the track system. The separate actuation of a locking device which must occur simultaneously with the entry onto and departure from the track system may either be accomplished at the wrong time or forgotten entirely thereby resulting in considerable damage to the vehicle as well as danger to other drivers when the vehicle is operated out of the track system on the normal roadway.

To avoid the above-noted disadvantages, a road vehicle of the aforementioned type is disclosed in, for example, in my above-noted U.S. Pat. No. 4,267,779, wherein a locking and unlocking of the pivotable rear axle takes place automatically when entering and leaving the guide path for track-guided operation without it being necessary for the driver to direct his attention to this procedure and/or take any special measures to effect the locking or unlocking of a pivotable rear axle.

The road vehicle of the aforementioned United States Application is adapted to be guided mechanically on tracks with an axle, preferably a rear axle arranged at a spacing from the vehicle fron axle with the rear axle being pivotable in the manner of a turntable at a frame of the vehicle about a vertical pivot axis. The rear axle includes an axle body and wheels mounted thereto with a tranverse-position interlock locking the axle in the exact transverse position. Track-determining transverse guide rollers are provided which have a vertical tread surface and are carried at least indirectly by the axle body. At least one of the transverse guide rollers is mounted to be transversely displaceable within mechanically predetermined end positions and be tensioned elastically from the operative position effective during driving along a track into an end position. At least one transverse guide roller carrier is movable respectively with one transversely displaceable transverse guide roller. The transverse guide roller carrier is coupled with the transverse-position interlock in such a manner that the axle, when the transverse guide roller is in the operative position, is unlocked, and, when the transverse guide roller is in one end position, is locked.

The transverse-position interlock in the aforementioned United States Patent Application includes a pressure-exposed jackknife-type blocking mechanism arranged between a cross member, pivotably mounted to the vehicle frame and the vehicle frame. In the blocking in-line position, the jackknife-type blocking mechanism prevents a pivoting of the cross member and thus a pivoting of the rear axle articulated to the cross member by way of longitudinal control arms. By means of a toggle arm chain operated by the transversely movable transverse guide roller, the jackknife-type blocking mechanism can be changed over from its blocking in line position into a non-blocking, clearance-providing flexing position wherein the cross member and thus the rear axle can be respectively pivoted about their pivot axis without impediment.

While the vehicle construction proposed in the aforementioned U.S. Application reliably ensures the automatic locking and unlocking of the rear axle for track-guided and normal road usage of the vehicle, the constructional features of the transverse-position interlock proposed therein may, from a constructional viewpoint, be considered to be expensive since a jackknife-type blocking mechanism is somewhat costly to manufacture.

The aim underlying the present invention essentially resides in providing a road vehicle and, more particularly, a mechanically trackable road vehicle, which includes a transverse-position interlock for the pivotable axle, which interlock is more advantageously constructed from the viewpoint of manufacturing techniques.

In accordance with advantageous features of the present invention, the transverse-position interlock includes a longitudinally displaceably mounted latch associated with the axle body. The latch is preferably coupled by way of a push rod with the transverse guide roller carrier and is displaceable thereby. The transverse-position interlock also includes a retaining block associated with the vehicle frame and being immovable at least in the transverse direction of the vehicle. The retaining block has a latch retainer engaged in a substantially shape-mating fashion by the latch in the exact transverse position of the axle.

By virtue of the transverse-position interlock in accordance with the present invention, a simplified construction is provided by merely associating a latch with the axle body and pivoting therewith this latch in the exact transverse position of the rear axle with the latch engaging in an essentially shape-mating fashion in the retaining block fixed in its spatial position at least in the pivoting direction of the rear axle so as to eliminate the pivotability of the rear axle during trackless driving. The unlocking of the rear axle takes place by disengaging of the latch from the retaining block by means of a transverse displacement of the transverse guide roller or rollers.

In the final analysis, the entire transverse-position interlock mechanism in accordance with the present invention includes merely two structural elements very simple from a constructional and manufacturing viewpoint, namely, the retaining block which is essentially fixed in its spatial position, and the latch longitudinally displaceable with respect to the block and engaging the later. Thus, the transverseposition interlock of the present invention results in a considerable simplification of the construction of a rear axle of the vehicle.

Advantageously, in accordance with the present invention, at least the transversely movable transverse guide roller with the transverse guide roller carrier is arranged on a supporting arm rigidly connected to the axle body and the latch is attached at the supporting arm, preferably, in the center of the vehicle.

Moreover, the retaining block of the present invention is articulated to the vehicle frame by means of a transverse control arm and is held at the supporting arm to be longitudinally displaceable with respect thereto. By this feature, the required vertical mobility of the transverse-position interlock is ensured so that the later can move up and down in correspondence with the movement of the rear axle.

Advantageously, in accordance with the present invention, the retaining block is slidably arranged in an approximately boxed-shaped hollow profile mounted to the supporting arm, preferably in the center of the vehicle, and extending in the transverse direction of the vehicle. By virtue of this arrangement, a constructionally simple mounting is attained with a simultaneous relative displacement of the retaining block on the supporting arm.

Advantageously, the latch is aligned essentially at a right angle to the hollow profile and the hollow profile exhibits a passage opening for accommodating the latch.

In accordance with further advantageous measures of the present invention, at least one elbow-shaped lever acts on the latch at least in the disengagement direction with the elbow lever being pivotably arranged at the supporting arm preferably at at least one bearing fishplate attached to the supporting arm and/or the hollow profile. One lever arm of the elbow-shaped lever being coupled preferably by way of a push rod with the transverse guide roller carrier and the other lever arm of the elbow lever engaging the latch with, preferably, a cross-piece projecting at right angle from the end of this latch. By virtue of these measures, a constructionally simple coupling of the latch to the transversely displaceable transverse guide rollers effecting the unlocking of the rear axle when the vehicle enters the guide track is obtained.

Advantageously, the latch is biased against a disengagement direction by means of at least one restoring spring.

In accordance with yet further advantageous features of the present inventin, the latch may include a centering pin with a conical tip and the latch retainer in the retaining block may include a fitting seat for the centering pin. By constructing the latch with a centering pin, the engagement of the latch into the latch retainer of the retaining block is substantially facilitated during the exiting of the vehicle from the guide track zone.

Advantageously, the centering pin may be provided with a conical tip and a fitting part of the shape of a truncated cone, the outer surface of this part forming a smaller angle with the axis of the pin than the outer surface of the conical tip. Preferably, the fitting seat has the shape adapted to the truncated cone-shaped fitting part.

Additionally, the latch may be slidingly arranged at least partially in a guide sleeve connected to the hollow profile and surrounding the passage opening of the later. Moreover, in accordance with the present invention, a transverse guide roller transversely displaceable within limits may be provided for each side of the vehicle. The two transverse guide rollers are respectively coupled with the latch by one transverse guide roller carrier and operate this latch in the same direction.

Accordingly, it is an object of the present invention to provide a mechanically trackable vehicle having an axle locking arrangement which avoids, by simple means, shortcomings and disadvantages encountered in the prior art.

Another object of the present invention resides in providing a mechanically trackable vehicle having an axle locking arrangement which ensures an automatic locking and unlocking of the axle when the vehicle enters and leaves a track system.

A further object of the present invention resides in providing a mechanically trackable vehicle which includes an axle locking arrangement having a transverse-position interlock which is simple in construction and therefore relatively inexpensive to manufacture.

Yet another object of the present invention resides in providing a mechanically trackable vehicle having an axle locking arrangement which ensures a locking of the axle in an exact transverse position for off track use of the vehicle.

A still further object of the present invention resides in providing a mechanically trackable vehicle having an axle locking arrangement which functions reliably under all operating conditions.

Another object of the present invention resides in providing a mechanically trackable vehicle having an axle locking arrangement which enhances the overall safe operation of the vehicle both on and off the track system.

A further object of the present invention resides in providing a mechanically trackable vehicle having a locking arrangement for a rear axle which considerably simplifies the construction of the rear axle.

These and other objects, features, and advantages of the present invention will become more apparent from the following description when taken in connection with the accompanying drawings which show, for the purposes of illustration only, one embodiment in accordance with the present invention, and wherein.

Figure 1:
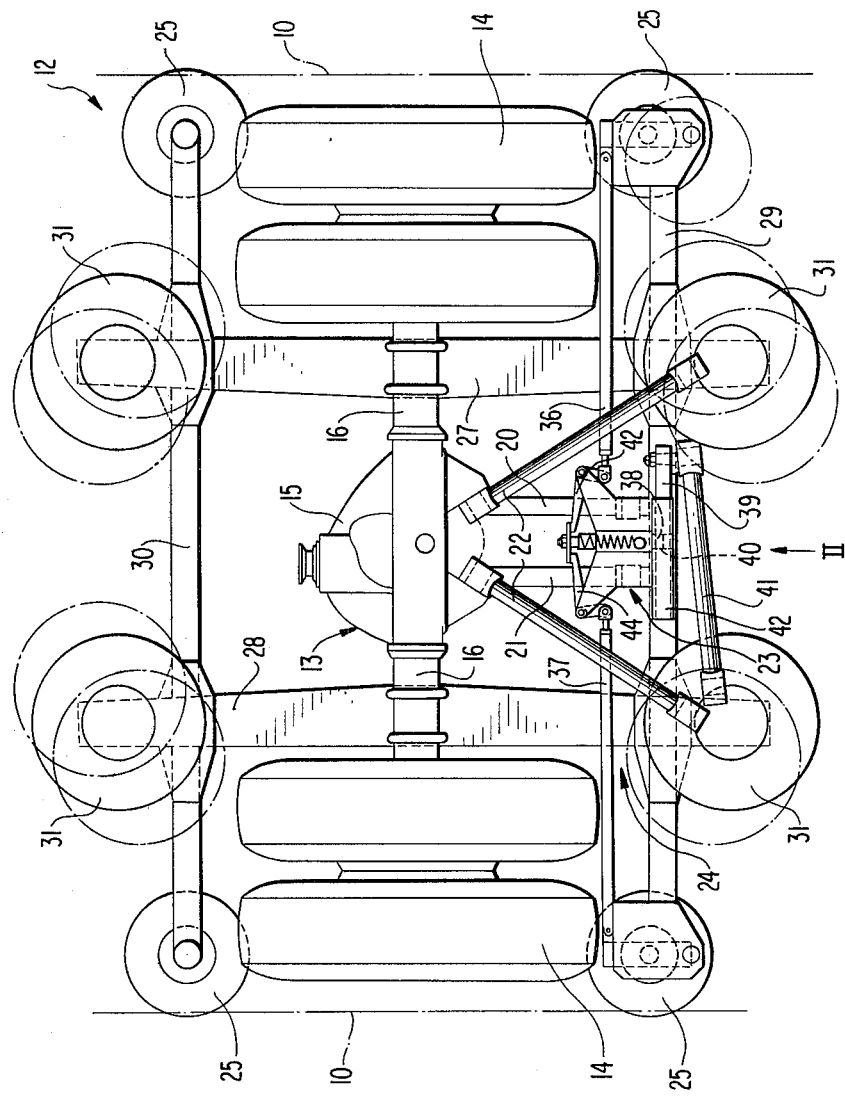
FIG. 1 is a top view of a rear axle associated with a mechanically trackable road vehicle utilizing the axle locking arrangement in accordance with the present invention.
Figure 2:
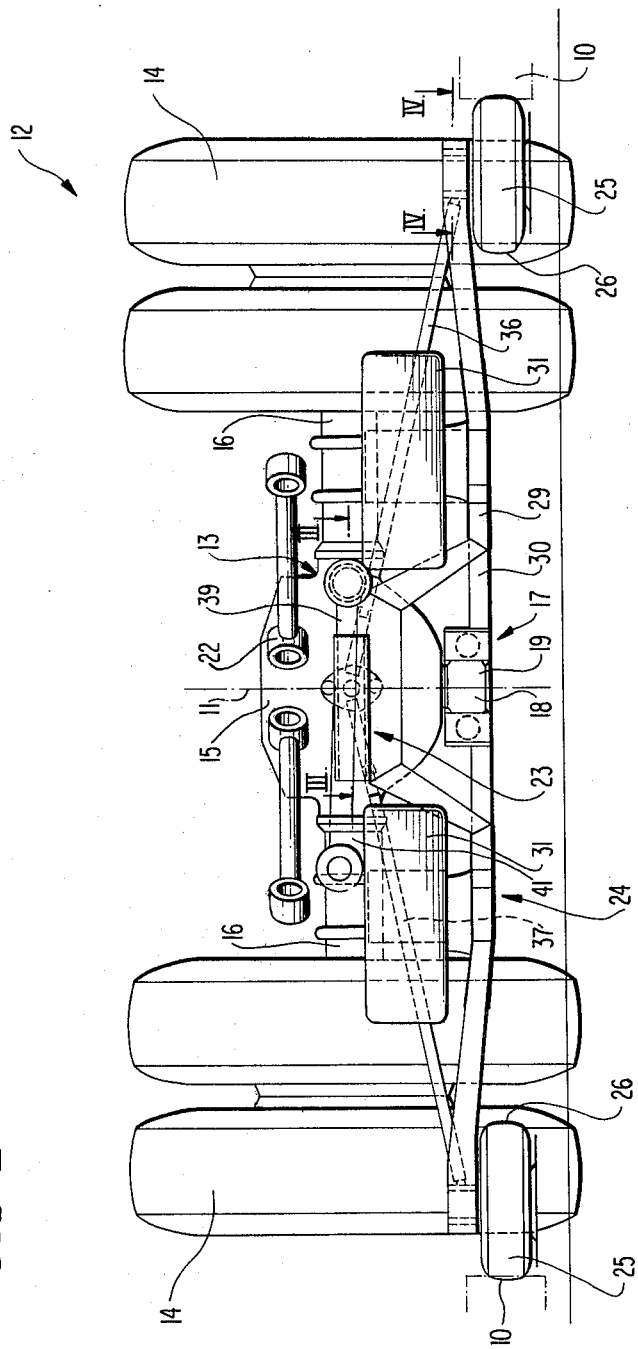
FIG. 2 is a lateral view of the rear axle taken in the direction of arrow II in FIG. 1.

Referring now to the drawings wherein like reference numerals are used throughout the various views to designate like parts and, more particularly, to FIGS. 1 and 2, according to these Figures, a track-guideable road vehicle adapted to travel trackless on a normal roadway as well as on tracks along a track system provided with laterally arranged guide rails 10 includes an axle generally designated by the reference numeral 12 pivotable in the manner of a turntable, about a vertical pivot axis 11. The axle 12 may, for example, be a rear axle of a vehicle and be arranged at a distance from the front axle (not shown) of the vehicle. The rear axle 12 includes an axle body generally designated by the reference numeral 13 with twin or tandem wheels 14 rigidly attached thereto. The axle body, also called an axle housing, of the rear axle 12, which is driven, includes a differential gear box 15 and axle or bearing support tubes or sleeves 16 adjoining both sides of the gear box 15. The pivot axis 11 of the rear axle 12 is determined by a pivot bearing generally designated by the reference numeral 17 arranged on an underside of the differential gear box 15. The pivot bearing 17 includes a bearing sleeve 18 and a bearing pin 19 held therein. Longitudinal controls arms 20, 21 are disposed on respective sides of the bearing sleeve 18. One end of each of the longitudinal control arms 20, 21 is articulated on the side of the axle body 14 with the other ends of the longitudinal control arms 20, 21 being pivotably movably mounted to the vehicle frame or chassis. A wishbone 22 unilaterally articulated to the vehicle frame hingedly engages at the axle body 13 at a relatively high level of the differential gear box 15.

The rear axle 12 is provided with a transverse-position interlock generally designated by the reference numeral 23 for locking the axle in an exact transverse position and with track-determining transverse guide rollers 25 supported at least indirectly by the axle body 13, namely, by way of a supporting frame generally designated by the reference numeral 24 rigidly attached to the axle body 13. As shown most clearly in FIG. 2, the transverse guide rollers 25 have vertical thread surfaces 26.

The supporting frame 24 includes two longitudinal struts 27, 28, each rigidly attached to the axle bearing sleeves 16 of the axle body 13, supporting arms 29, 30, aligned at right angles to the longitudinal vehicle axis, mounted to the longitudinal struts 27, 28, forwardly and rearwardly of the twin wheels, 14, as viewed in a normal driving direction of the vehicle. At least one of transverse guide rollers 25 is mounted on the respective ends of the supporting arms 29, 30 with air suspension bellows 31 being arranged at the respective ends of the longitudinal struts 27, 28 by way of which the vehicle frame is supported on the rear axle 12 or vice versa.

As described more fully in the aforementioned U.S. Pat. No. 4,267,779, the transverse guide rollers 25, arranged at the suppoting arm 29 located in front of the axle body 13, as viewed in the normal driving direction of the vehicle, are held so that they are transversely displaceable within mechanically predetermined end positions and are tensioned from the operative position, effective during driving along a track, into an end position.

Figure 4:
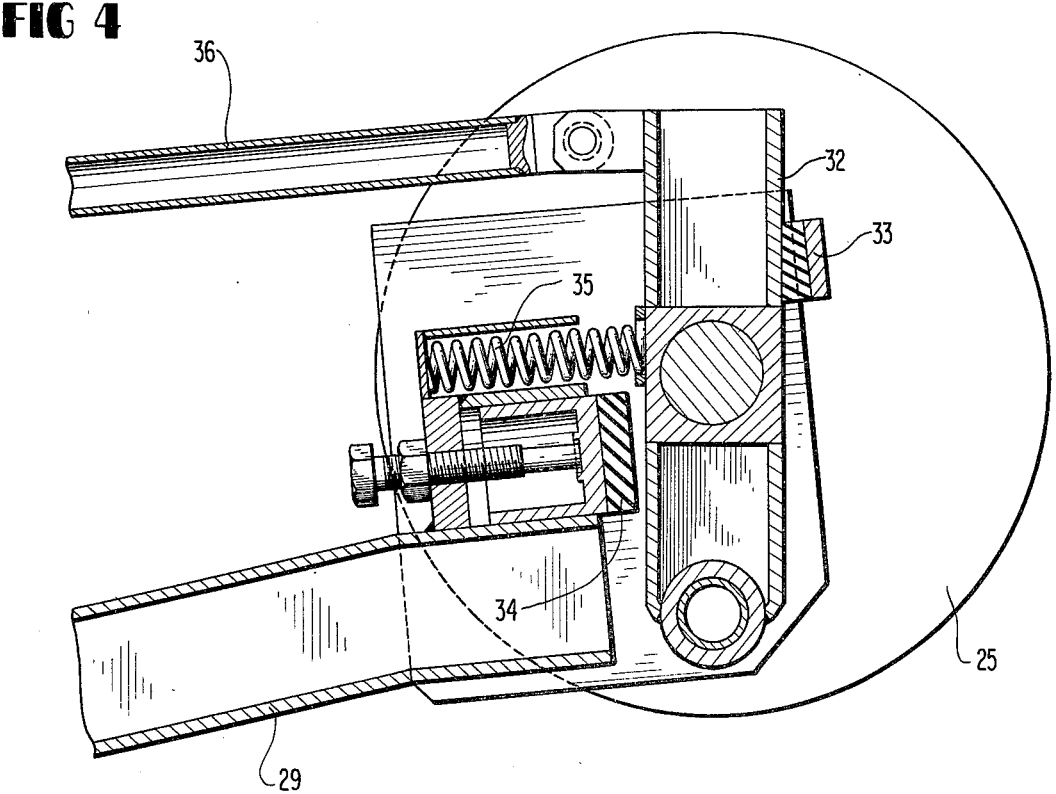
FIG. 4 is a cross sectional view taken along the line IV—IV in FIG. 2.

For this purpose, as shown in FIG. 4, each of the two transversely movable transverse guide rollers 25 is rotatably mounted on a transverse guide roller carrier 32. The transverse guide roller carrier is pivotably arranged on the supporting arm 29. Two stops 33, 34 limit the pivotability of the transverse guide roller carrier 32. When the transverse guide roller 25 is not under stress, the transverse guide roller carrier 32 contacts stop 33 under the action of a compression spring 35. A push rod 36, articulated to the free end of the transverse guide roller carrier 32 remote from the pivot point, couples the transverse guide roller carrier 32 with the transverse position interlock 23. For further discussion regarding the structure and mode of operation of the transverse guide roller 25 of FIG. 4, reference is made to the aforementioned U.S. Pat. No. 4,267,779 which is incorporated herein by reference to the extent necessary in understanding the present invention. The transverse guide roller 25 arranged at the other end of the supporting arm 29, which is likewise movable in the transverse direction, is of identical construction and is also coupled with the transverse-position inter lock by the push rod 37 (FIG. 1).

Figure 3:
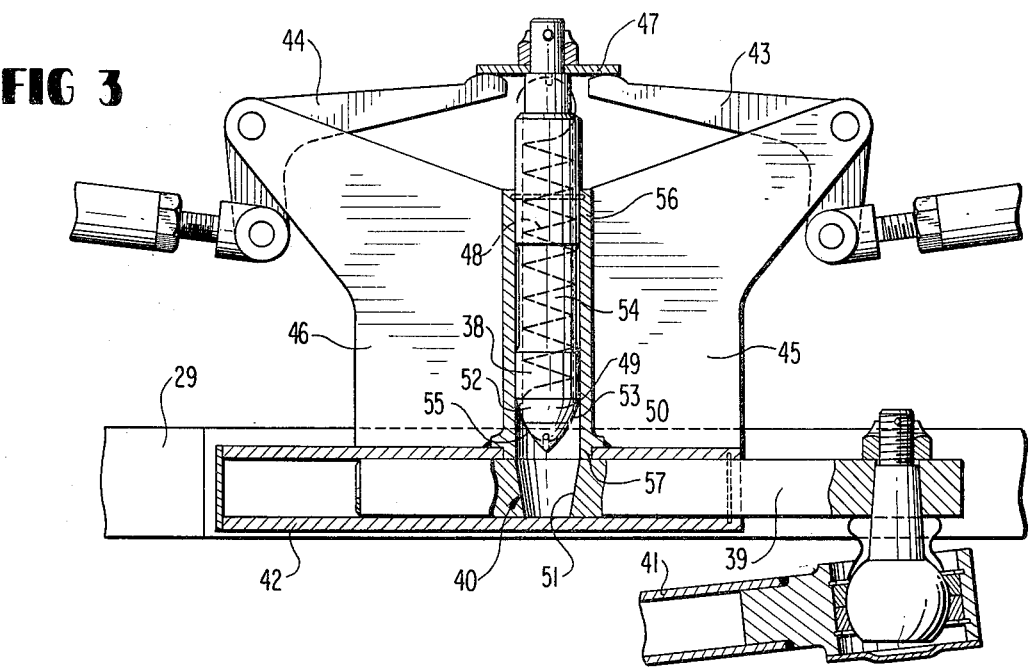
FIG. 3 is a cross sectional view taken along the line III—III in FIG. 2.

The transducer position interlock 23, as shown most clearly in FIG. 3, includes a longitudinally displaceable latch 38 which is associated with the axle body 13. the latch 38 is coupled by the respective push rods 36, 37 to one of the transverse guide roller carriers 32 and is adapted to be moved by the carriers 32. The latch 38 is held at the supporting arm 29 in the center of the vehicle in a manner described more fully hereinbelow.

The transverse position interlock 23 further includes a retaining lock 39 provided with a latch retainer generally designated by the reference numeral 40. The retaining block 39 is associated with the vehicle frame and is immovable at least in a transverse direction of the vehicle when latch 38 is engaged. The latch 38 engages in an essentially shape-mating manner into the retaining block 39 so as to enable an exact transverse positioning of the pivotable rear axle 12. A transverse control arm (FIGS. 1, 2, and 4,) articulates the retaining block 39 to the vehicle frame and the retaining block 39 is held at the supporting arm 29 so as to be longitudinally displaceable relative thereto.

For this purpose, as shown most clearly in FIG. 2, the supporting arm 29 is bent in an upward direction in the center of the vehicle and, in this area of upward bending, a fixedly arranged approximately box-shaped hollow profile member 42 (FIGS. 1, 3) is carried, which profile member 42 extends in the transverse direction of the vehicle. The retaining block 39, preferably constructed as a rectangular or square bar, is slidably arranged in the box-shaped hollow profile 42.

Two L-shaped or bellcrank levers 43, 44 are pivotably supported at the supporting arm 29 with the respective levers 43, 44 acting on the latch 38 so as to urge the latch 30 into a disengagement direction. For this purpose, two bearing fishplates 45, 46 are attached to the supporting arm 29 with the fishplates 45, 46 extending in parallel to the latch 38 away from the supporting arm 29. The levers 43, 44 are, respectively, pivotably mounted to the bearing fishplates 45, 46.

One lever arm of each of the levers 43, 44 engages a crosspiece 47 provided at the latch 38. The crosspiece 47 projects from the end side of the latch 38. The other lever arm of each of the levers 43, 44 is respectively connected by the push rods 36, 37 to the transverse guide roller carrier 38 on both sides of the supporting arm 29. Two restoring springs, diametrically opposed at the latch 38, are provided for pretensioning the latch 38 against a displacement in the disengagement direction. In FIG. 3 only the rearward restoring spring 48 is visible, which spring is fashioned as a tension spring and is engaged with the latch 38 and the supporting arm 29.

The latch 38 includes a centering pin 49 and a latch retainer 40 in the retaining block 39 is configured as a fitting seat 51 for accommodating the centering pin 49. The centering pin 49 includes a conical tip 50 in a fitting part 52 having the shape of a truncated cone. An outer surface 53 of the fitting part 52 forms a smaller angle with a longitudinal axis 54 of the centering pin 49 than the outer surface 55 of the conical tip 50. The fitting seat 51 is adapted in its shape to the truncated-cone fitting part 52 so that the centering pin 49 with the truncated-cone fitting part 52 engages the fitting seat 51 in a shape-mating fashion.

The latch 38 is slidingly arranged at least partially within a guide sleeve 56 attached to the box-shaped hollow profile member 42 with the sleeve 56 surrounding a passage opening 57 in the hollow profile member 42. The centering pin 49 is adapted to engage the fitting seat 51 in the retaining block 39 through the passage opening 57. The transverse-position interlock 23 of the present invention operates as follows:

When the vehicle is freely driven along a normal roadway, the transversely displaceable transverse guide rollers 25 are unstressed on the supporting arm 29 and are held, by the compression spring 35, in their end positions shown in FIG. 4, which end positions determined by the mechanical stop 33. In such end position, the levers 43, 44 are relieved from the associated push rods 36, 37 and the restoring spring 48 pulls the latch 38, through the passage opening 57 in the hollow profile member 42, into the latch retainer 40. At this point, the latch 38 engages the retaining block 39 in a shapemating fashion whereby the supporting arm 29 and thus the entire supporting frame 24 are rigidly connected to the retaining block 39. Since the retaining block 39 can only execute movements in the vertical direction, the rear axle 12 is thus locked in an exact transverse position.

As soon as the vehicle enters a guide track, at least one of the two transversely movable transverse guide rollers 25 contacts one of the guide tracks 10 and is pushed inwardly against the action of the restoring spring 35. During this step, the transverse guide roller carrier 32 is pivoted inwardly until it contacts the mechanical stop 34. The pivotal motion of the transverse guide roller 32 is transmitted by the push rod 36 or 37 to the associated lever 43 or 44 and, for example, the lever 43 is pivoted in the clockwise direction, whereas, the lever 44 is pivoted in the counter clockwise direction, whereby the latch 38 is lifted, against the action of the restoring spring 48, out of the latch retainer 40 in the retaining block 39. At this point in time, the retaining block 39 and the hollow profile member 42 can be displaced relatively to each other in the longitudinal direction. Since the articulated connection between the transverse control arm 41 and the retaining block 39 permits a certain twisting motion, the supporting frame 24 and thus the entire rear axle can now be pivoted about the pivot axis 11 within certain limits, with the hollow profile member 42 sliding along the fixed retaining block 39.

Generally, an exiting from the guide track is accomplished along a short straight path section of the guide track so that the latch 38, when leaving the guide track, is approximately in alignment with the latch retainer 40 in the retaining block 39. Due to the centering pin 49 with the conical tip 50, the threading or inserting of the latch 38 into the latch retainer 40 is ensured even if the latch 38 and the latch retainer 40 are not exactly aligned. Since, after leaving the guide track, the transversely movable transverse guide rollers 25 on the supporting arm 29 are unstressed, the transverse guide roller carrier 32 is respectively pivoted back into the position illustrated in FIG. 4 by means of the restoring spring 35 whereby the levers 43, 44 are again relieved of pressure. The restoring spring 48 pulls the latch 38 into the latch retainer 40 and locks the rear axle 12 in the exact transverse position for vehicle operation on a normal road surface.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A bi-modal mechanically trackable vehicle adapted to be driven with or without a guide track, the vehicle including at least one non-steerable axle having non-steerable wheels mounted thereon, at least one tracking transverse guide roller means on each side of the vehicle for guiding the vehicle along a guide track, means for mounting the at least one non-steerable axle on the vehicle so as to be freely pivotable about a vertical axis, means for at least indirectly mounting the at least one transverse guide roller means at the at least one non-steerable axle in an area of the wheels so as to be displaceable transversely of the vehicle within pre-set limits and for participation in the pivotable movement of the non-steerable axle, and means for automatically selectively locking the at least one non-steerable axle in an exact transverse position for driving of the vehicle without a guide track and for unlocking the at least one non-steerable axle from the exact transverse position for driving of the vehicle with a guide track, characterized in that the locking means includes a latch means longitudinally displaceable mounted on the non-steerable axle means, a latch retaining means for engaging the latch means in a substantially shape-mating fashion when the at least one non-steerable axle is in the exact transverse position, means for mounting the latch retaining means on a frame of the vehicle so as to be immovably retainable at least with respect to a transverse direction of the vehicle, and in that means are provided for coupling the latch means to the transverse guide roller means so as to enable the latch means to be longitudinally displaced by the transverse guide roller means to unlock the at least one non-steerable axle for driving on the guide track in response to transverse displacement of one of the at least one guide roller means between said pre-set limits by engagement with a guide track.

2. A vehicle according to claim 1, characterized in that the means for mounting the at least one guide roller means so as to be transversely displaceable comprises a supporting frame means provided for indirectly mounting the at least one transverse guide roller means at the at least one non-steerable axle means, and transverse guide roller carrier means provided on the supporting frame means for mounting the at least one transverse guide roller means on the supporting frame means, wherein said coupling means are interposed between said carrier means and said latch means in such a manner that the latch means unlocks the at least one non-steerable axle when the transverse guide roller means is in a first operative position effective when the vehicle is driven with a track guide and to lock the at least one non-steerable axle when the transverse guide roller means is in a second operative position effective when the vehicle is driven without a track guide, and means are provided for elastically tensioning the carrier means from the first operative position into the second operative position.

3. A vehicle according to claim 2, characterized in that said coupling means includes a push rod means for transmitting a displacement of the transverse guide roller means to the latch means.

4. A vehicle according to claim 3, characterized in that the supporting frame means includes at least one supporting arm rigidly connected to an axle body of the at least one non-steerable axle, the at least one transverse guide roller means and the transverse guide roller carrier means are disposed on the supporting arm, and in that the latch means is disposed on the supporting arm approximately at a center of the supporting arm.

5. A vehicle according to claim 4, characterized in that the means for mounting the latch retaining means on the frame of the vehicle includes a transverse control arm means for articulatingly connecting the latch retaining means to the vehicle frame, and in that means are provided for enabling the latch retaining means to be longitudinally displaceable with respect to the supporting arm.

6. A vehicle according to claim 5, characterized in that the means for enabling a longitudinal displacement of the latch retaining means includes an approximately box-shaped hollow profile member mounted to the supporting arm, the profile member is arranged approximately centrally of the support arm and extends in a transverse direction of the vehicle.

7. A vehicle according to one of claim 6 characterized in that the coupling means further includes at least one two-armed lever means connected with the push rod means for acting upon the latch means in a disengagement direction of the latch means from the retaining means, means are provided for pivotally mounting the at least one lever means on one of the supporting arm and the hollow profile member, the latch means includes a crosspiece extending approximately at a right angle from an end of the latch means and in that one arm of the two-armed lever means is connected to the push rod means and the other arm of the two-armed lever means is adapted to engage the crosspiece.

8. A vehicle according to claim 7, characterized in that means are provided for normally biasing the latch means in a direction opposite the disengagement direction thereof.

9. A vehicle according to claim 8, characterized in that said biasing means includes at least one restoring spring.

10. A vehicle according to claim 8, characterized in that the latch means includes a centering pin having a conical tip, and in that the latch retaining means includes a retaining block having a seat means for accommodating the centering pin.

11. A vehicle according to claim 10, characterized in that the centering pin further includes a fitting part shaped as a truncated cone, an outer surface of the truncated cone forms a smaller angle with a longitudinal center axis of the centering pin than an angle formed between an outer surface of the conical tip and the longitudinal center axis, and in that the seat means has a shape adapted to the truncated cone shape of the fitting part.

12. A vehicle according to claim 11, characterized in that a guide sleeve means is provided and is connected to the hollow profile member for at least partially guiding the latch means in a longitudinal direction, the latch means is disposed essentially at a right angle to the hollow profile member, and in that means are provided in the hollow profile member for enabling the latch means to enter the hollow profile member, and in that said guide sleeve means surrounds the means for enabling the latch means to enter the hollow profile member.

13. A vehicle according to claim 12, characterized in that at least two transverse guide roller means are mounted in an area of the wheels of the vehicle, said transverse guide roller means are disposed at respective sides of the vehicle, a guide roller carrier means is provided at each side of the vehicle for mounting the respective transverse guide roller means at the supporting frame means, and in that a coupling means is interposed between each carrier means and said latch means so as to enable the respective transverse guide roller means to operate said latch means in the same direction.

14. A vehicle according to claim 6 or 7 or 8 or 9 or 10 or 11 or 13, characterized in that the latch means is disposed essentially at a right angle to the hollow profile member, and in that means are provided in the hollow profile member for enabling the latch means to enter the hollow profile member.

15. A vehicle according to claim 1, characterized in that said coupling means includes a push rod means for transmitting a displacement of the transverse guide roller means to the latch means.

16. A vehicle according to one of claim 15, characterized in that the means for mounting the latch retaining means on the frame of the vehicle includes a transverse control arm means for articulatingly connecting the latch retaining means to the vehicle frame, and in that means are provided for enabling the latch retaining means to be longitudinally displaceable with respect to the supporting arm.

17. A vehicle according to one of claims 1 or 15, characterized in that means are provided for normally biasing the latch means in a direction opposite the disengagement direction thereof.

18. A vehicle according to one of claims 1 or 15, characterized in that the latch means includes a centering pin having a conical tip, and in that the latch retaining means includes a retaining block having a seat means for accommodating the centering pin.

19. A vehicle according to claim 18, characterized in that the centering pin further includes a fitting part shaped as a truncated cone, an outer surface of the truncated cone forms a smaller angle with a longitudinal center axis of the centering pin than an angle formed between an outer surface of the conical tip and the longitudinal center axis, and in that the seat means has a shape adapted to the truncated cone shape of the fitting part.

20. A vehicle according to claim 1, characterized in that at least two transverse guide roller means are provided, a supporting frame means is provided for indirectly mounting the transverse guide roller means at the at least one non-steerable axle in an area of the wheels on respective sides of the vehicle so as to be displaceable transversely of the vehicle, a guide roller carrier means is provided on each side of the vehicle for mounting the respective transverse guide roller means on the supporting frame means, and coupling means are interposed between each carrier means and the latch means for controlling a displacement of the latch means into a disengaged position, and in that means are provided for elastically tensioning each of the carrier means into an operative position effective when the vehicle is driven without a track guide.

21. A vehicle according to claim 20, characterized in that said coupling means includes a push rod means disposed between each carrier means and the latch means for transmitting a displacement of the respective guide roller means to the latch means.

22. A vehicle according to claim 21, characterized in that the supporting frame means includes at least one supporting arm rigidly connected to an axle body of the at least one non-steerable axle, the respective transverse guide roller means and the respective transverse guide roller carrier means are disposed on the supporting arm, and in that the latch means is disposed on the supporting arm approximately at a center of the supporting arm.

23. A vehicle according to claim 22, characterized in that the means for mounting the latch retaining means on the frame of the vehicle includes a transverse control arm means for articulatingly connecting the latch retaining means to the vehicle frame, and in that means are provided for enabling the latch retaining means to be longitudinally displaceable with respect to the supporting arm.

24. A vehicle according to claim 23, characterized in that the means for enabling a longitudinal displacement of the latch retaining means includes an approximately box-shaped hollow profile member mounted to the supporting arm, the profile member is arranged approximately centrally of the support arm and extends in a transverse direction of the vehicle.

25. A vehicle according to claim 24, characterized in that the coupling means further includes at least one two-armed lever means connected with the push rod means for acting upon the latch means in a disengagement direction of the latch means from the retaining means, means are provided for pivotally mounting the at least one lever means on one of the supporting arm and the hollow profile member, the latch means includes a crosspiece extending approximately at a right angle from an end of the latch means and in that one arm of the two-armed lever means is connected to the push rod means and the other arm of the two-armed lever means is adapted to engage the crosspiece.

26. A vehicle according to one of claims 24 or 25, characterized in that the coupling means includes a pair of two-armed lever means respectively connected with the push rod means for acting upon the latch means a disengagement direction, means are provided for pivotally mounting each of the two-armed lever means on one of the supporting arm and the hollow profile member, the latch means includes a crosspiece extending approximately at a right angle from an end of the latch means, and in that one arm of each of the two-armed lever means is connected to a respective push rod means and the other arm of the respective two-armed lever means is adapted to engage the crosspiece.

27. A vehicle according to claim 26, characterized in that means are provided for normally biasing the latch means in a direction opposite the disengagement direction thereof.

28. A vehicle according to claim 27, characterized in that the latch means includes a centering pin having a conical tip, and in that the latch retaining means includes a retaining block having a seat means for accommodating the centering pin.

29. A vehicle according to claim 28, characterized in that the centering pin further includes a fitting part shaped as a truncated cone, an outer surface of the truncated cone forms a smaller angle with a longitudinal center axis of the centering pin than an angle formed between an outer surface of the conical tip and the longitudinal center axis, and in that the seat means has a shape adapted to the truncated cone shape of the fitting part.

30. A vehicle according to claim 29, characterized in that a guide sleeve means is provided and is connected to the hollow profile member for at least partially guiding the latch means in a longitudinal direction, in that means are provided in the hollow profile member for enabling the latch means to enter the hollow profile member, and in that said guide sleeve means surrounds the means for enabling the latch means to enter the hollow profile member.

31. A vehicle according to claim 20, characterized in that the means for mounting the latch retaining means on the frame of the vehicle includes a transverse control arm means for articulatingly connecting the latch retaining means to the vehicle frame, and in that means are provided for enabling the latch retaining means to be longitudinally displaceable with respect to the supporting arm.

32. A vehicle according to claim 20, characterized in that means are provided for normally biasing the latch means in a direction opposite the disengagement direction thereof.

33. A vehicle according to claim 20, characterized in that the latch means includes a centering pin having a conical tip, and in that the latch retaining means includes a retaining block having a seat means for accommodating the centering pin.

34. A vehicle according to claim 33, characterized in that the centering pin further includes a fitting part shaped as a truncated cone, an outer surface of the truncated cone forms a smaller angle with a longitudinal center axis of the centering pin than an angle fromed between an outer surface of the conical tip and the longitudinal center axis, and in that the seat means has a shape adapted to the truncated cone shape of the fitting part.

35. A bi-modal mechanically trackable vehicle adapted to be driven with or without a guide track, the vehicle including at least one non-steerable axle having non-steerable wheels mounted thereon, at least one tracking transverse guide roller means for guiding the vehicle along a guide track, means for at least indirectly mounting the at least one transverse guide roller means at the at least one non-steerable axle in an area of the wheels so as to be displaceable transversely of the vehicle, means for mounting the at least one non-steerable axle on the vehicle so as to be freely pivotable about a vertical axis, and means for automatically selectively locking the at least one non-steerable axle in an exact transverse position for driving of the vehicle without a guide track and for unlocking the at least one non-steerable axle from the exact transverse position for driving of the vehicle with a guide track, characterized in that the locking means includes a latch means longitudinally displaceable mounted on the non-steerable axle means, a latch retaining means for engaging the latch means in a substantially shape-mating fashion when the at least one non-steerable axle is in the exact transverse position, means for mounting the latch retaining means on a frame of the vehicle so as to be immovably retainable at least with respect to a transverse direction of the vehicle, in that means are provided for coupling the latch means to the transverse guide roller means so as to enable the latch means to be longitudinally displaced by the transverse guide roller means to unlock the at least one non-steerable axle for driving on the guide track, and in that the means for mounting the latch retaining means on the frame of the vehicle includes a transverse control arm means for articulatingly connecting the latch retaining means to the vehicle frame, and in that means are provided for enabling the latch retaining means to be longitudinally displaceable with respect to the supporting arm.

36. A vehicle according to claim 16 or 35 characterized in that the means for enabling a longitudinal displacement of the latch retaining means includes an approximately box-shaped hollow profile member mounted to the supporting arm, the profile member is arranged approximately centrally of the support arm and extends in a transverse direction of the vehicle.

37. A vehicle according to claim 36, characterized in that the latch means is disposed essentially at a right angle to the hollow profile member, and in that means are provided in the hollow profile member for enabling the latch means to enter the hollow profile member.

* * * * *